United States Patent
Yoshikawa

(10) Patent No.: US 6,626,795 B2
(45) Date of Patent: Sep. 30, 2003

(54) TOROIDAL-TYPE CONTINUOUSLY VARIABLE TRANSMISSION

(75) Inventor: Tomonobu Yoshikawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 31 days.

(21) Appl. No.: 10/050,947

(22) Filed: Jan. 22, 2002

(65) Prior Publication Data

US 2002/0151407 A1 Oct. 17, 2002

(30) Foreign Application Priority Data

Jan. 23, 2001 (JP) .................................. P. 2001-014694

(51) Int. Cl.$^7$ ............................................... F16H 15/38
(52) U.S. Cl. ........................ 476/73; 384/606; 384/614
(58) Field of Search ............................... 476/46, 8, 40, 476/72, 73; 384/606, 614

(56) References Cited

U.S. PATENT DOCUMENTS 6,368,245 B1 * 4/2002 Goto et al. .................... 476/46

FOREIGN PATENT DOCUMENTS

| EP | 1083350 A2 | 3/2001 |
|---|---|---|
| JP | 2-49411 | 12/1990 |
| JP | 6-165753 | 3/1994 |
| JP | 004003 | 1/2001 |
| JP | 146922 | 5/2001 |

* cited by examiner

Primary Examiner—David Fenstermacher
(74) Attorney, Agent, or Firm—Sughrue Mion, PLLC

(57) ABSTRACT

The toroidal-type continuously variable transmission comprises an input shaft, an input disk, an output disk, a plurality of trunnions, a plurality of power rollers, and power roller bearings, wherein the mutually opposed inner surfaces of the input and output disks are respectively formed as concave surfaces each having an arc-shaped section, the peripheral surfaces of the power rollers are respectively formed as spherical-shaped convex surfaces, and these peripheral surfaces are contacted with the above-mentioned inner surfaces. The retainer of the power roller bearing is formed of high strength brass, and the high strength brass has a micro structure in which the α phase thereof is 40% or more in the area ratio thereof, and the hardness of said retainer is set at HB80 or higher.

3 Claims, 3 Drawing Sheets

TOROIDAL-TYPE CONTINUOUSLY VARIABLE TRANSMISSION

BACKGROUND OF THE INVENTION

The present invention relates to a toroidal-type continuously variable transmission and, for example, to a toroidal-type continuously variable transmission for use in a vehicle such as a car.

Conventionally, as a toroidal-type continuously variable transmission, for example, there is known a transmission which has such a structure as shown in FIG. 1.

Specifically, in the interior of a housing (not shown), an input disk 1 and an output disk 2 are disposed in such a manner that they are concentric with each other but are opposed to each other. An input shaft 3 is penetrated through the axial core portion of a toroidal transmission part in which the input disk 1 and output disk 2 are disposed. On one end of the input shaft 3, there is disposed a loading cam 4. This loading cam 4 is structured such that it can transmit the power (rotational force) of the input shaft 3 to the input disk 1 through a cam roller 5.

Also, between the input disk 1 and output disk 2, there are interposed a plurality of trunnions swingable about their respective support shafts (not shown) disposed at positions twisted with respect to the center axes of the two disks 1 and 2 (in other words, between the input disk 1 and output disk 2, there are interposed a plurality of trunnions swingable about their respective support shafts (not shown) each of which is disposed at a positions that is perpendicular to an axial line of the input shaft 3 and does not intersect the axial line thereof (this physical relationship is referred as "a twisted position".).

The input disk 1 and output disk 2 are substantially the same in shape and are also arranged symmetric, while their respective opposed surfaces are respectively formed as toroidal surfaces which, when they are viewed in the axial-direction section thereof, cooperate together in forming a substantially semicircular shape. Within a toroidal cavity defined by the toroidal surfaces of the input disk 1 and output disk 2, a pair of power roller bearings 6 and 7 are disposed for power transmission in such a manner that they are in contact with the input disk 1 and output disk 2.

By the way, the power roller bearing 6 comprises a power roller 6a (which corresponds to an inner ring forming the power roller bearing 6) capable of rolling on the toroidal surfaces of the input disk 1 and output disk 2, an outer ring 6b, and a plurality of rolling elements (steel balls) 6c. On the other hand, the other power roller bearing 7 comprises a power roller 7a (which corresponds to an inner ring forming the power roller bearing 7) capable of rolling on the toroidal surfaces of the input disk 1 and output disk 2, an outer ring 7b, and a plurality of rolling elements (steel balls) 7c.

That is, the power roller 6a serves also as the inner ring which is a component of the power roller bearing 6, and the power roller 7a serves also as the inner ring which is a component of the power roller bearing 7. In this structure, the power roller 6a is mounted pivotally and rotatably on a trunnion 10 through a pivot shaft 8, the outer ring 6b and the plurality of rolling elements 6c, and also is supported so as to be inclinable about a shift shaft 0 which provides the center of the toroidal surfaces of the input disk 1 and output disk 2.

On the other hand, the power roller 7a is mounted pivotally and rotatably on a trunnion 11 through a pivot shaft 9, the outer ring 7b and the plurality of rolling elements 7c, and also is supported so as to be inclinable about a shift shaft 0 which provides the center of the toroidal surfaces of the input disk 1 and output disk 2. And, lubricating oil (traction oil) having large viscous frictional resistance is supplied to the contact surfaces of the input disk 1 and output disk 2 with respect to the power roller 6a and power roller 7a, in such a manner that the power input to the input disk 1 can be transmitted to the output disk 2 through the film of the lubricating oil, power roller 6a and power roller 7a.

By the way, the input disk 1 and output disk 2 are connected with the input shaft 3 through needle roller bearings 12 such that they are independent of the input shaft 3 (that is, they are held in a state where they are not influenced directly by the power of the input shaft 3). On the output disk 2, there is disposed an output shaft 14 which is arranged in parallel to the input shaft 3 and also supported rotatably on the housing (not shown) through angular contact ball bearings 13.

In the toroidal-type continuously variable transmission 20, the power of the input shaft 3 is transmitted to the loading cam 4. In case where the loading cam 4 is rotated due to this power transmission, power generated by the rotation of the loading cam 4 is transmitted through the cam roller 5 to the input disk 1, so that the input disk 1 can be rotated. Further, power generated by the rotation of the input disk 1 is transmitted through the power rollers 6a and 7a to the output disk 2. As a result of this, the output disk 2 is rotated integrally with the output shaft 14.

In speed change, the trunnions 10 and 11 are moved by a slight distance in the directions of the shift shafts 0, respectively. That is, due to the movements of the trunnions 10 and 11 in the axial direction thereof, the intersection between the rotation axes of the power rollers 6a, 7a and the axes of the input and output disks 1, 2 is shifted slightly. This shift loses balance between the rotation peripheral speeds of the power rollers 6a, 7a and the rotation peripheral speed of the input disk 1. In addition, due to the component of the rotation drive force of the input disk 1, the power rollers 6a, 7a are allowed to inclinedly roll around the shift shafts 0, whereby the power rollers 6a, 7a are allowed to incliningly roll on the curved surfaces of the input and output disks 1, 2. As a result of this, the speed ratio is changed, so that the speed of the vehicle is decreased or increased. As a toroidal-type continuously variable transmission having the above structure, for example, there is known a conventional transmission which is disclosed in JP-B-2-49411U.

In the above-mentioned toroidal-type continuously variable transmission, when driven, there is a fear that the power roller retainers of the power roller bearings interposed between the input and output disks can be damaged or broken. The reason for this is as follows: that is, when this toroidal-type continuously variable transmission is driven with a high load and high torque, the inner ring raceways of the power roller bearings, which have received loads from the input and output disks, are respectively deformed into an elliptic shape; and, when the rolling elements held by the retainers roll along the thus-deformed raceways, the rolling elements apply loads to the retainers. As a measure to deal with problem, there is known a method of enhancing the strength of the retainers. However, in this method, in case where the strength of the retainers is increased, seizure can occur between the contact portions between the retainers and power roller inner rings or outer rings, or the power roller inner rings or outer rings can be broken by the retainers.

SUMMARY OF THE INVENTION

The present invention aims at eliminating the above problems found in the conventional toroidal-type continuously variable transmission. Accordingly, it is an object of the invention to provide a toroidal-type continuously variable transmission in which the retainers of the power roller bearings are made of high-strength brass to thereby be able to optimize the strength of the retainers.

In attaining the above object, according to the invention, there is provided a toroidal-type continuously variable transmission, comprising: an input shaft; an input disk rotatable together with the input shaft; an output disk disposed concentrically with the input disk and supported rotatable with respect to the input disk; a plurality of trunnions respectively swingable about support shafts disposed at twisted positions with respect to the center axes of the input and output disks; a plurality of shift shafts respectively supported on their associated trunnions; a plurality of power rollers respectively rotatably supported on the shift shafts and interposed between the input and output disks; and thrust ball bearings for supporting thrust loads applied to the power rollers, wherein each of the thrust ball bearing comprises: an inner ring raceway formed in the outer peripheral surface of the power roller; an outer ring including an outer ring raceway formed in the inner peripheral surface thereof; a plurality of balls interposed between and rollable along the inner ring raceway and outer ring raceway; and, a retainer for holding the balls, wherein the retainer is formed of high strength brass and the high strength brass has a micro structure in which the α phase thereof is 40% or more in the area ratio thereof.

Preferably, the hardness of the retainer may be set at HB80 or higher.

Further, preferably, the α phase is set in the range of 40% to 80%.

DETAILED DESCRIPTION OF THE PREFERRED EMBODIMENTS

Now, description will be given below in more detail of a toroidal-type continuously variable transmission according to the invention.

Figure 2:
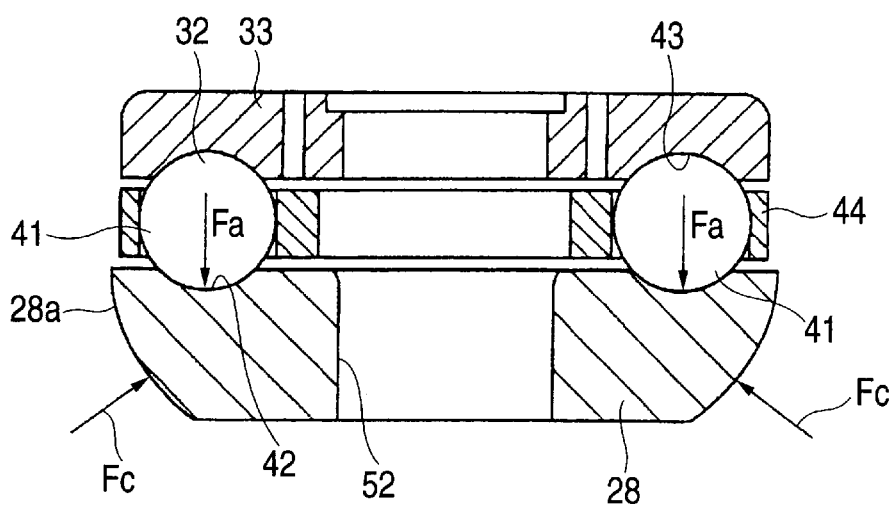
FIG. 2 is an explanatory view of a power roller and a thrust ball bearing that are the main portions of a toroidal-type continuously variable transmission according to the invention.

FIG. 2 shows the main portions of a toroidal-type continuously variable transmission according to the invention: that is, a power roller 28; and, a thrust ball bearing 32 which is a power roller bearing for supporting a thrust load applied to the power roller 28. This thrust ball bearing 32 is structured in the following manner. A plurality of balls 41, 41 held by a circular-ring-shaped retainer 44 are interposed between an inner ring raceway 42 formed in the outer surface (in FIG. 2, upper surface) of the power roller 28 and an outer ring raceway 43 formed in the inner peripheral surface of an outer ring 33, in such a manner that the balls 41, 41 are allowed to roll on the inner ring raceway 42 and outer ring raceway 43. And, the peripheral surface (traction surface) 28a of the power roller 28 is contacted with the inner surfaces 1a, 2a of the input side and output side disks 1 and 2 to thereby be able to transmit power between the two disks 1 and 2.

The retainer 44 is formed of high strength brass.

Figure 1:
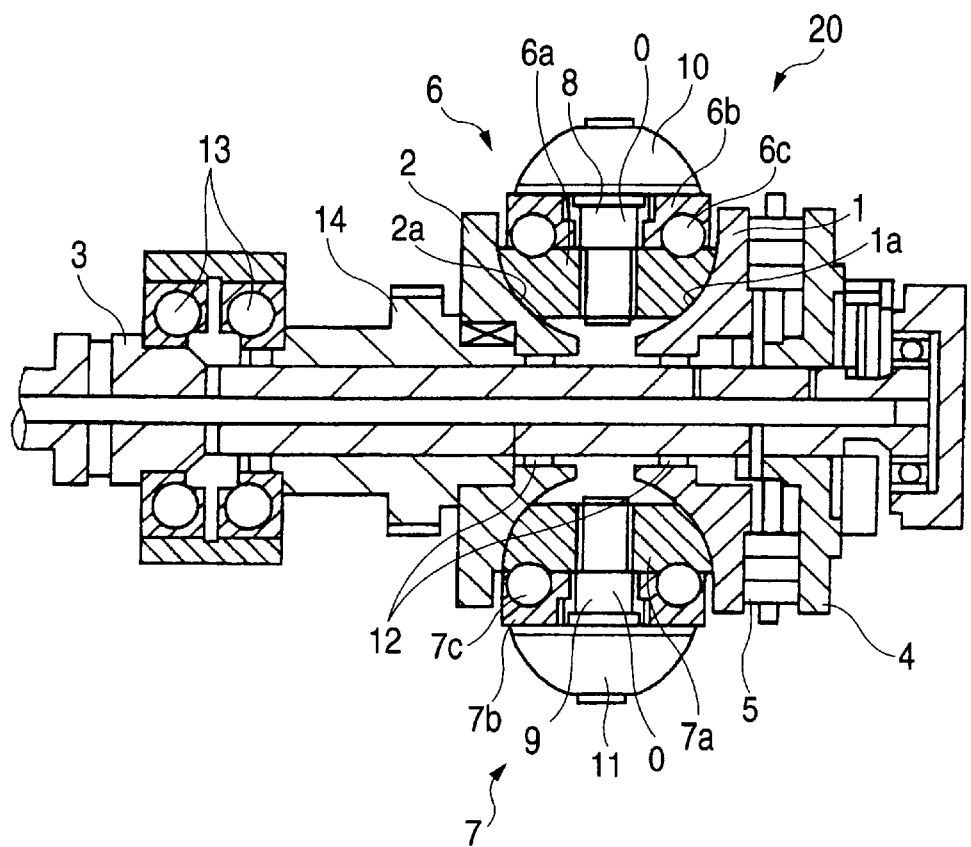
FIG. 1 is an explanatory view of a toroidal-type continuously variable transmission.

The reason why high strength brass is used as the material of the retainer 44 is as follows. That is, in the power roller 28, the traction surface 28a receives normal forces Fc from the two output and input side disks. At the same time, in the inner ring raceway 42, the power roller 28 receives normal forces Fa from the balls 41. In FIG. 1, the vertical-direction components of the normal forces Fc balance well with the normal forces Fa, whereas the horizontal-direction components of the normal forces Fc act as a force to crash the power roller 28. This force provides a force to deform the power roller 28, so that the raceway surface of the power roller 28 is slightly deformed into an elliptic shape.

Balls 41 are held in a circular shape by the retainer 44 but, since the raceway surface of the power roller 28 is slightly deformed into an elliptic shape, the balls 41 are caused to roll on the elliptic-shaped raceway surface. Therefore, as the balls roll, the retainer is rotated while the retainer is being deformed into an elliptic shape. However, the retainer is not originally designed while taking such deformation into account. That is, for example, in case where the retainer is formed of plastics, the retainer is easy to break, or in case where the retainer is formed of steel such as SPCC, the retainer cannot be broken but, since the retainer is contacted with the power roller 28 or outer ring 33 while rotating, seizure can occur in the retainer. On the other hand, in case where the retainer is formed of high strength brass, the retainer is worn in the contact portion between the ball 41 and retainer 44 to thereby relieve the degree of contact, which can prevent the retainer from being broken.

Figure 4:
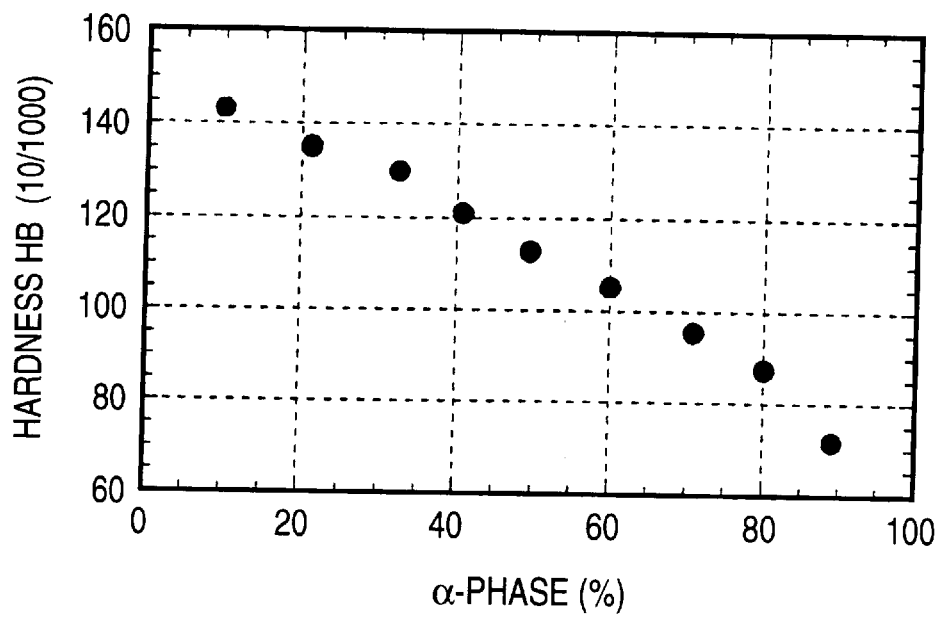
FIG. 4 is a characteristic diagram of the relationship between the hardness and α-phase of high strength brass; and, FIG. 5 is a characteristic diagram of the relationship between the fatigue strength and α phase of high strength brass.
Figure 5:
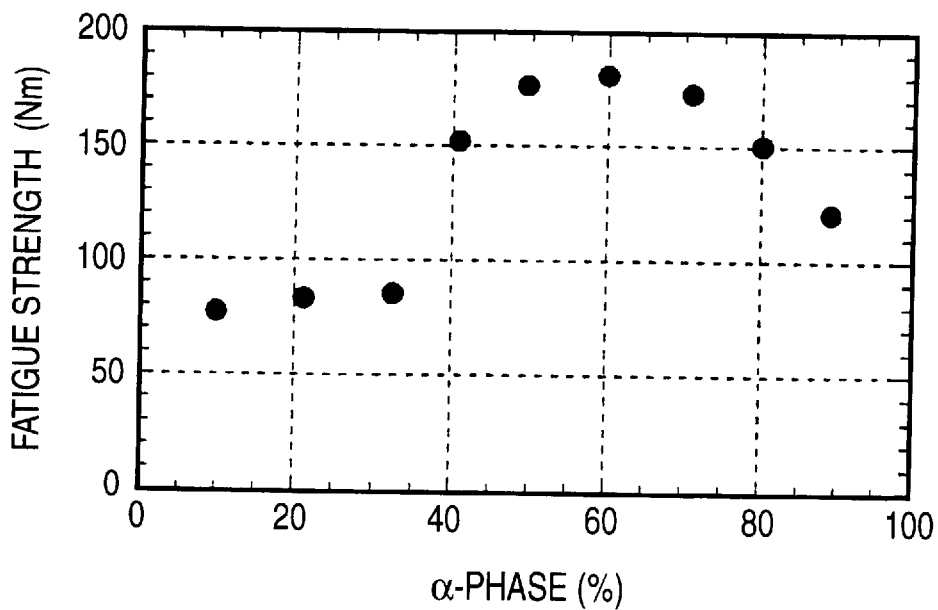

Also, in the case of the high strength brass, in case where the optimum-composition is selected, there can be obtained a retainer which is excellent in fatigue strength. In the case of the high strength brass, its hardness lowers as its α phase decreases (FIG. 4). On the other hand, the fatigue strength of the high strength brass increases greatly in case where its α phase exceeds 40% (FIG. 5). This disagrees with the tendency of ordinary steel material in which the fatigue strength increases as the hardness increases. The reason why the high strength brass provides the above tendencies seems that the high strength has a two-phase structure composed of α phase and β phase.

For the power roller of a toroidal-type continuously variable transmission, from the viewpoint of the fatigue strength, the α phase is required to be 40% or more; and, from the viewpoint of the material strength, the hardness is required to be HB80 or higher. Also, preferably, the α phase may be set in the range of 40% to 80%.

In case where the above-mentioned high strength brass is used as the material of the power roller retainer, there can be obtained a toroidal-type continuously variable transmission which can prevent the retainer against damage and can enjoy a long life.

[Embodiments]

Now, description will be given below of the embodiments of the invention. By the way, the basic structure of a toroidal-type continuously variable transmission according to the invention is similar to that shown in FIG. 1, but the present toroidal-type continuously variable transmission is different in the material of the power roller retainer from the conventional toroidal-type continuously variable transmission.

Using two kinds of high strength brass HBsC1 and HBsC2, there were manufactured two kinds of high strength brass retainers for a power roller. Also, as comparison examples, there were manufactured a plastic retainer using nylon 66 and a steel-made retainer using SPCC.

Using the above power roller retainers, there were assembled toroidal-type continuously variable transmissions. In the case of disks and power rollers, mass-produced disks and power rollers were used.

A durability test was conducted under the following conditions 1; specifically, the test was conducted until the retainer was broken or seized, or the test was conducted up to 100 hr. and was stopped with the retainer not broken. The test results are shown in the following table 1. In the case of the high strength brass HBsC1 and HBsC2, the retainers were both found not broken. On the other hand, in the case of the plastic retainer according to the comparison example 1, the retainer was found broken; and, in the case of the comparison example 2, the power roller was found seized.

Test condition 1:
Number of rotation of input shaft: 4000 r.p.m.
Input torque: 350 Nm
Oil used: Traction oil
Oil supply temperature: 100° C.

TABLE 1

| | Kinds of Retainers | Test Time (hr) | Test Results |
|---|---|---|---|
| Embodiments 1 | HBsC1 | 100 | Not Broken |
| Embodiments 2 | HBsC2 | 100 | Not Broken |
| Comparison Examples 1 | Nylon 66 | 5 | Retainer was broken |
| Comparison Examples 2 | SPCC | 16 | Power roller was seized |

Figure 3:
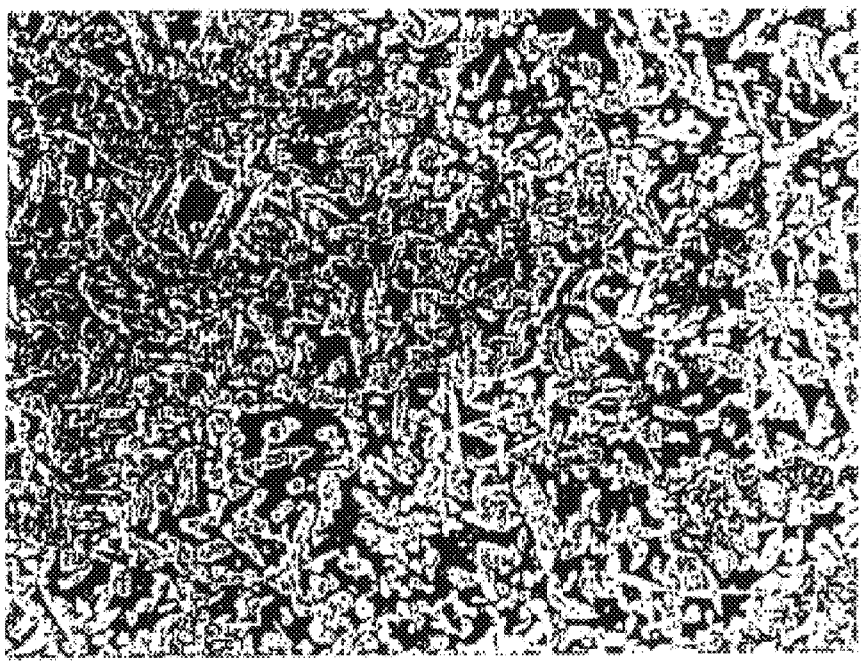
FIG. 3 is a sketch of microscope picture of the microstructure of high strength brass.

Next, such chemical compositions as shown in the following table 2 were dissolved and cast to thereby produce high strength brass. The structure of the thus-produced high strength brass was observed using a microscope and the area ratio of the α phase thereof was obtained. FIG. 3 shows a microscope picture of the micro structure of the high strength brass (×100 corrosion solution ferric chloride hydrochloride solution). Also, the hardness of the high strength brass was measured at the same time. A rotational bending fatigue test was conducted on the respective kinds of high strength brass and the fatigue strengths of the respective kinds of high strength brass at $10^7$ cycle were obtained. The thus obtained results are shown in the following table 3.

TABLE 2

| | Chemical compositions (%) | | | | | | | | |
|---|---|---|---|---|---|---|---|---|---|
| | Cu | Zn | Mn | Fe | Al | Sn | Ni | Pb | Si |
| Embodiment 3 | 59.32 | 36.19 | 2.25 | 0.76 | 0.94 | 0.17 | 0.18 | 0.16 | 0.012 |
| Embodiment 4 | 59.99 | 35.48 | 2.25 | 0.76 | 0.97 | 0.18 | 0.18 | 0.17 | 0.017 |
| Embodiment 5 | 59.98 | 35.57 | 2.26 | 0.74 | 0.82 | 0.18 | 0.18 | 0.19 | 0.017 |
| Embodiment 6 | 59.98 | 35.81 | 2.23 | 0.74 | 0.65 | 0.17 | 0.17 | 0.18 | 0.008 |
| Embodiment 7 | 59.99 | 34.71 | 3.41 | 0.75 | 0.56 | 0.15 | 0.19 | 0.19 | 0.009 |
| Comparison examples 3 | 56.38 | 39.21 | 2.21 | 0.70 | 0.97 | 0.16 | 0.17 | 0.17 | 0.010 |
| Comparison examples 4 | 57.51 | 38.05 | 2.22 | 0.74 | 0.96 | 0.17 | 0.16 | 0.18 | 0.008 |
| Comparison examples 5 | 58.52 | 37.01 | 2.21 | 0.75 | 0.95 | 0.18 | 0.18 | 0.18 | 0.012 |
| Comparison examples 6 | 59.99 | 34.22 | 3.99 | 0.76 | 0.51 | 0.15 | 0.19 | 0.18 | 0.009 |

TABLE 3

| | Phase area Ratio (%) | Hardness (HB) | Fatigue Strength (Nm) 10 cycle |
|---|---|---|---|
| Embodiment 3 | 41 | 121 | 152 |
| Embodiment 4 | 49 | 113 | 178 |
| Embodiment 5 | 60 | 105 | 182 |
| Embodiment 6 | 71 | 95 | 174 |
| Embodiment 7 | 80 | 87 | 151 |
| Comparison examples 3 | 10 | 144 | 78 |
| Comparison examples 4 | 21 | 136 | 83 |
| Comparison examples 5 | 32 | 130 | 86 |
| Comparison examples 6 | 89 | 71 | 120 |

In the results shown in Table 3, the relations between the α phase area ratios and hardnesses were put in order and the relations between the α phase area ratios and fatigue strengths were put in order. The hardness lowered as the α phase area ratio decreased. On the other hand, the fatigue strengths increased greatly in case where the α phase exceeded 40%.

Next, using the high strength brass shown in Table 3, there were manufactured power roller retainers, there were assembled toroidal-type continuously variable transmission units, and a durability test was conducted on the retainers and transmission units. The test condition is the same as the test condition 1. The test was conducted until retainers and transmission units were broken, or, in the case of the test in which they were not broken, the test was conducted up to 300 hrs. and was then broken off.

The following table 4 shows the test results. In the case of the embodiments, the test was ended in 300 hrs. with the retainers and transmission units not broken. In the case of the comparison examples 3–5, the test was ended in 123–131 hrs. where the retainers were found broken. Also, in the case of the comparison example 6, the test was broken off because the rotation accuracy could not be obtained due to the deformation of the retainer. That is, in the comparison example 6, the test was discontinued because the strength of the retainer was not sufficient for the power rollers of the toroidal-type continuously variable transmission.

TABLE 4

| | Test Time (hrs.) | Test results |
|---|---|---|
| Embodiment 3 | 300 | Not broken |
| Embodiment 4 | 300 | Not broken |
| Embodiment 5 | 300 | Not broken |
| Embodiment 6 | 300 | Not broken |
| Embodiment 7 | 300 | Not broken |
| Comparison examples 3 | 123 | Retainer was broken. |
| Comparison examples 4 | 131 | Retainer was broken. |
| Comparison examples 5 | 158 | Retainer was broken. |
| Comparison examples 6 | 44 | Test was discontinued due to deformed retainer. |

As has been described heretofore in detail, according to the invention, by using the high strength brass as the material of the retainer of a power roller bearing, there can be supplied a toroidal-type continuously variable transmission which can provide high durability.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A toroidal-type continuously variable transmission, comprising:

an input shaft;

an input disk rotatable together with said input shaft;

an output disk disposed concentrically with said input disk and supported rotatable with respect to said input disk;

a plurality of trunnions respectively swingable about support shafts disposed at twisted positions with respect to the center axes of said input and output disks;

a plurality of shift shafts respectively supported on said trunnions;

a plurality of power rollers respectively rotatably supported on said shift shafts and interposed between said input and output disks; and thrust ball bearings for supporting thrust loads applied to said power rollers, wherein each of said thrust ball bearing comprises:

an inner ring raceway formed in the outer peripheral surface of said power roller;

an outer ring including an outer ring raceway formed in the inner peripheral surface thereof;

a plurality of rolling elements interposed between and rollable along said inner ring raceway and said outer ring raceway; and, a retainer for holding said balls therein, wherein said retainer is formed of high strength brass and said high strength brass has a micro structure in which the $\alpha$ phase thereof is 40% or more in the area ratio thereof, and the hardness of said retainer is set at HB80 or higher.

2. The toroidal-type continuously variable transmission according to claim 1, wherein the $\alpha$ phase of the high strength brass is 80% or less in the area ratio of the micro structure.

3. The toroidal-type continuously variable transmission according to claim 1, wherein the retainer is a circular-ring shaped retainer.

* * * * *